United States Patent [19]

Clow et al.

[11] Patent Number: 5,576,041
[45] Date of Patent: Nov. 19, 1996

[54] PROCESS FOR PRODUCING LATTICED FRIED FOOD AND PRODUCT THEREOF

[75] Inventors: Andrew E. C. Clow, Downley; Brian D. Hill, Sutton Coldfield, both of United Kingdom

[73] Assignee: United Biscuits (UK) Limited, West Drayton, United Kingdom

[21] Appl. No.: 363,709

[22] Filed: Dec. 23, 1994

[30]    Foreign Application Priority Data

Jun. 10, 1994 [GB] United Kingdom ............... 9411694

[51] Int. Cl.$^6$ ........................................ A21C 11/04
[52] U.S. Cl. .................. 426/439; 426/391; 426/438; 426/440; 426/445; 426/446; 426/496; 426/502; 426/503; 426/517; 426/518; 426/560; 425/294; 425/363; 425/337
[58] Field of Search ..................... 426/144, 391, 426/438–440, 445, 446, 496, 502, 503, 517, 518, 560, 550, 549, 808; 425/294, 327, 335, 363, 337

[56]              References Cited

U.S. PATENT DOCUMENTS

| | | | |
|---|---|---|---|
| 1,566,771 | 12/1925 | Perky | 425/363 |
| 2,405,661 | 8/1946 | MacManus | 426/503 X |
| 2,567,248 | 9/1951 | Stahmer | 426/518 |
| 3,394,431 | 7/1968 | Nalle, Jr. | 425/327 X |
| 4,289,470 | 9/1981 | Johnston et al. | 425/336 |
| 4,508,739 | 4/1985 | Ryan | 426/144 |
| 4,618,498 | 10/1986 | Thulin | 426/503 X |
| 4,680,191 | 7/1987 | Budd et al. | 426/439 |
| 4,717,328 | 1/1988 | D'Alterio | 425/290 |
| 4,937,084 | 6/1990 | Julian | 426/144 |
| 4,973,481 | 11/1990 | Hunt et al. | 426/144 |
| 5,308,633 | 5/1994 | Gardner | 426/503 |
| 5,402,715 | 4/1995 | Kurachi et al. | 425/294 X |

FOREIGN PATENT DOCUMENTS

| | | |
|---|---|---|
| 0387606 | 9/1990 | European Pat. Off. . |
| 713925 | 8/1954 | United Kingdom . |
| 1331042 | 9/1973 | United Kingdom . |
| 1466018 | 3/1977 | United Kingdom . |
| 1499225 | 1/1978 | United Kingdom . |
| 9105483 | 5/1991 | WIPO . |
| 9210101 | 6/1992 | WIPO . |

Primary Examiner—Esther Kepplinger
Assistant Examiner—Milton I. Cano
Attorney, Agent, or Firm—Lockwood, Alex, Fitzgibbon & Cummings

[57]              ABSTRACT

Fried food products are produced by feeding a dough to a nip between a pair of contrarotating rollers arranged with their curved surfaces in contact with each other, and each of the rollers has grooves indented into its curved surface. The rollers push the dough into the grooves and form the dough into a lattice comprising an array of ridges imparted to the dough by one of the rollers, which ridges are spaced apart from and extend in substantially the same direction as each other, and an array of ridges imparted to the dough by the other roller, which ridges are spaced apart from and extend in substantially the same direction as each other. The direction in which the ridges of one array extend are at an angle to that of the other array so that the ridges of one array intersect the ridges of the other, and the contacting portions of the curved surfaces of the rollers form apertures in the dough between the intersecting ridges. Portions are cut from the dough lattice, and the portions are fried to provide fried food products having a lattice configuration.

26 Claims, 6 Drawing Sheets

PROCESS FOR PRODUCING LATTICED FRIED FOOD AND PRODUCT THEREOF

The invention relates to the production of food products, and especially to the production of fried food products, more especially, fried snack food products.

The invention provides a process for producing fried food products, which comprises feeding a dough to a nip between a pair of contra-rotating rollers arranged with their axes parallel to each other and with their curved surfaces in contact with each other, each of the rollers having grooves indented in its curved surface, and wherein the rollers push the dough into the grooves and form the dough into a lattice comprising an array of ridges imparted to the dough by one of the rollers, which ridges are spaced apart from each other and extend in substantially the same direction as each other, and an array of ridges imparted to the dough by the other roller, which ridges are spaced apart from each other and extend in substantially the same direction as each other, the direction in which the ridges of one array extend being at an angle to that of the other array so that the ridges of one array intersect the ridges of the other, and the contacting portions of the curved surfaces of the rollers provide apertures in the dough between the intersecting ridges, and the process further comprises cutting portions from the dough lattice and frying the portions to provide food products having a lattice configuration.

The process of the invention enables the production of a snack food product which has an attractive appearance by reason of its lattice structure, and which breaks down easily in the mouth. The snack food product, which may be a savoury snack food product, can be made from any of a variety of doughs of different compositions, and may be made from one or more of the following: wheat, maize, potato and rice.

Previously, snack food products having a lattice configuration have made by slicing potatoes. With such a process it has been found difficult to obtain uniformity in cuts across the potatoes so that there is commonly a variation in cut over each piece of sliced potato, and between one piece and another. With the process of the invention, however, using rollers to shape a dough into a lattice structure, it is possible to exercise much greater control over the formation of the lattice than is possible in the potato-slicing process, and a product which is uniform in size and configuration can readily be obtained.

After mixing the dough, the dough may be fed directly to the nip between the grooved rollers, for example, by means of a hopper positioned over the nip. As the dough enters the nip between the grooved rollers, the contacting portions of the curved surfaces, or lands, of the rollers cause the dough to be pushed into the grooves in the rollers to form the ridges of the lattice, the contacting lands providing the apertures.

Alternatively, after mixing and before the dough is fed to the grooved rollers, it may first be formed into a flat sheet, preferably, by passing it between one or more pairs of smooth rollers. The grooved rollers then act on the sheet of dough to redistribute the dough, portions of the sheet that encounter the lands of the rollers being pushed into the grooves to provide the ridges, and apertures being formed where the lands contact each other.

The term "ridges" is used throughout the specification to refer to the whole of the dough of which the lattice is composed and is not intended to imply the presence of any dough other than that in the ridges. The term "ridges" is used partly because each portion of the dough contained in a ridge will often (but not necessarily) have a V-shaped profile as discussed below, but also because the ridges stand proud of the mean thickness of the dough.

With either of the above methods of feeding the dough to the grooved rollers, the angle at which the ridges imparted to the dough by one of the rollers intersect the ridges imparted to the dough by the other roller, together with the width of the lands between the ridges, define the shape of the apertures between them. If as is often preferred the ridges of one array intersect the ridges of the other array at an angle of substantially 90°, the shapes of the apertures between the ridges of the dough at least immediately before it leaves the rollers are substantially rectangular. Preferably, the apertures are substantially square. It may, however, be desired for the ridges of one array to intersect the ridges of the other array at an angle other than substantially 90° so as to obtain apertures of which the shapes are parallelograms that are not rectangles or squares.

It will generally be found that the dough lattice is released without difficulty from the grooved rollers, but also that the lattice stretches easily. Care should therefore be taken on removal of the dough lattice from the grooved rollers and in subsequent handling of the dough lattice in order to avoid undesired distortion. That stretching characteristic can, however, be used to allow the shape of the apertures in the lattice to be altered as the dough leaves the rollers by adjusting the tension of the dough lattice. Thus, for example, square apertures having their diagonals extending in the direction of travel of the dough can be altered to rhomboidal apertures, if desired, by increasing the tension. Equally, square apertures with pairs of sides extending in the direction of travel of the dough can be altered to rectangular apertures. Such an increase in tension can be achieved by adjusting the speed of a conveyor arranged to transport the dough lattice from the rollers.

In the process of the invention, one of the rollers may be formed with an array of longitudinally-extending grooves and the other roller may be formed with an array of grooves extending circumferentially. That arrangement will be referred to hereinafter as "the longitudinal/circumferential arrangement".

Alternatively, one or both of the rollers may be formed with one or more grooves extending helically around the roller. Thus, one or both of the rollers may be formed with only a single groove (and, correspondingly, only a single land) extending helically around the roller from one end to the other. Accordingly, the expressions "grooves" and "lands" where they are used in this specification to refer to one roller should be interpreted as including a reference to a single continuous helically-extending groove and a single continuous helically-extending land, respectively. When the rollers are both provided with helically-extending grooves, the arrangement is preferably such that the ridges of both of the arrays imparted to the dough preferably extend in directions which are inclined at angles of substantially 45° to the direction of travel of the dough between the rollers, the ridges of one array being inclined in the opposite sense to the ridges of the other array. That arrangement of grooved rollers will be hereinafter referred to as "the 45° helical arrangement". With such an arrangement, it will usually be found necessary for each roller to be formed with a series of helically-extending grooves, which may be arranged in parallel with each other, rather than only a single groove, because if only a single helically-extending groove were provided on each roller the ridges imparted to the dough would not generally be close enough together to provide a recognisable lattice having an acceptable number of ridges and apertures in the finished food product.

When it is desired to form a dough lattice in which the two arrays of ridges intersect at an angle of substantially 90°, the 45° helical arrangement of grooved rollers may be preferred to the longitudinal/circumferential arrangement because, with such a helical arrangement, the cross-sectional area of the grooves in the nip of the grooved rollers remains substantially constant as the rollers rotate and dough is accepted by the rollers at a substantially constant rate. With the longitudinal/circumferential arrangement, the cross-sectional area of the grooves in the nip varies periodically with the rotation of the roller having the longitudinal grooves.

Also, as the dough emerges from the grooved rollers having the 45° helical arrangement, the rate at which the area of the surface of the dough moves out of contact with the rollers is substantially constant, whereas with the longitudinal/circumferential arrangement that rate increases periodically as each ridge produced by the longitudinally-extending grooves moves out of contact with the roller and then decreases.

In deciding on the lattice design required in the final food product, and hence the dimensions and spacing of the grooves on the rollers, allowance should be made for the composition of the dough being used and the amount by which it increases in volume during frying. Such an increase in volume can lead to a decrease in the size of the apertures or even complete closing of the apertures. Allowance should also be made for elastic recovery or relaxation of the dough after leaving the rollers. It may be found that there is distortion of the ridges and of the overall shape of the food product after cutting of the dough and during frying, but some distortion is not necessarily undesirable and may, in fact, enhance the appearance of the finished product.

The cross-sectional area of the grooves on each roller should not be so small, and/or the width of the lands so large, that the food product is too fragile. On the other hand, thick ridges can result in a food product that is too tough or hard, or which requires an undesirably long frying time.

In the case where the dough is formed into a flat sheet prior to feeding to the grooved rollers, it has been found unnecessary for the grooved rollers to produce any significant reduction in the piece weight of the dough entering and leaving the rollers. (The term "piece weight" is used in this specification to mean the weight of a piece of dough removed from the sheet by impressing on the sheet a circular cutter having an internal diameter which is large by comparison with the size of the apertures in the resulting lattice, the cutter being so applied to the sheet that it does not extend beyond the edge of the sheet.) Although it can readily be arranged that there is some reduction in piece weight at the grooved rollers, it may be preferred to have no such reduction, the dough lattice emerging from the rollers at the same speed at which the dough sheet enters them.

The cross-sectional area of the grooves in the nip of the rollers at any instant should generally be sufficient to accept the volume of dough supplied to the rollers at that instant without undue compression of the dough, or without excess force being exerted on the rollers, which might cause them to move apart and out of contact with each other, at least over a part of their length. Equally, the rate at which the dough is supplied to the nip of the rollers must be sufficient to ensure that, at a given rate of rotation of the rollers, the grooves are filled by the dough so that a well-defined dough lattice results. In the case where the dough is formed into a flat sheet before entering the nip between the grooved rollers, the rate of supply of dough can be varied by adjusting the thickness of the sheet entering the nip or the speed at which the sheet is supplied to the rollers.

In practice it will be found that once the number, dimensions and spacing of the grooves in the rollers have been selected taking into account the composition of the dough, then the rate of supply of dough to the grooved rollers, and the rate of rotation of the rollers can readily be adjusted to give the required lattice configuration to the dough. It may, however, be found that the requirement that contact between the curved surfaces of the rollers be maintained along their length throughout operation of the process imposes a limitation on the length of the rollers that can be used because of the deformability of the rollers.

The grooves may each have a rounded profile or they may each have side walls that are straight in profile and have a flat or curved base. In that case, the side walls may be arranged so that they are parallel to each other and meet the curved surface of the roller at an angle of 90°. Advantageously, however, each groove has side walls that are inclined towards each other in a direction towards the base of the groove, and preferably has a substantially V-shaped profile and has pair of side walls that meet at the base of the groove at an angle within the range of from 60° to 120°, preferably from 90° to 110°. The depth of each groove is advantageously within the range of from 0.50 to 1.50 mm, preferably from 0.75 to 1.38mm. The width of each groove at the curved surface of the roller is advatageously within the range of from 1.73 to 5.2 mm, preferably, from 2.14 to 2.87 mm. The width of each land between adjacent grooves is advantageously within the range of from 1.00 to 5.50 mm, preferably from 1.40 to 2.80 mm. The dimensions of each groove are advantageously so selected from the above ranges that the cross-sectional area of each groove is within the range of from 0.43 to 3.90 $mm^2$, and preferably from 0.80 to 1.98 $mm^2$. Once the dimensions of the grooves have been selected, the width of the lands can be chosen to give apertures of the desired size in the lattice taking into account the considerations of fragility of the lattice and increase in volume of the dough during frying as discussed above.

Although the dimensions of each groove indented in the curved surface of each of the rollers is advantageously the same as the dimensions of the other grooves on the same roller, it will be appreciated that need not be the case. Also, it is possible to choose an arrangement in which the dimensions of the grooves (and the width of the lands) of one roller differ from those of the other roller of the pair.

The grooves are advantageously such that the ridges imparted to the dough extend along straight lines, and each ridge is substantially parallel to the other ridges of the same array. Alternatively, the grooves may be such that the lines along which the ridges extend are wavy and, in that case, the spacing between adjacent ridges (and the widths of the lands of the rollers) may vary along their lengths. It will, however, usually be preferred that the lands of the rollers are of uniform width so that the ridges of each array imparted to the dough are uniformly spaced from each other and the dough lattice has a uniform mesh. It is, however, possible to arrange that the width of adjacent lands vary so that a dough lattice emerges from the rollers having a wider "mesh" over one or more portions of its width than over others.

In practice, on starting operation of the process, it may be found advantageous for the grooved rollers to be out of contact with each other initially. Then, as the dough is engaged by the grooved rollers, the gap between the rollers can be closed until the curved surfaces of the rollers contact each other along their length and the dough lattice is formed.

In the process of the invention, after the portions have been cut from the dough lattice, they may be subjected to a preliminary drying step in order to decrease their moisture content before being fried. Advantageously, such a preliminary drying step is arranged to decrease the moisture content of each portion by approximately 10% by weight, based on the weight of the water present in the portion before preliminary drying takes place.

The invention also provides apparatus suitable for carrying out the process of the invention, the apparatus comprising a pair of rollers arranged for rotation in opposite senses with their axes parallel to each other and with their curved surfaces in contact with each other, each of the rollers having an array of grooves indented in its curved surface, and means for feeding a dough to the nip between the rollers, the grooves of one of the rollers being spaced apart from each other and extending in substantially the same direction as each other, and the grooves of the other roller being spaced apart from each other and extending in substantially the same direction as each other, the direction in which the grooves of one array extend being at an angle to that of the other array so that, in the nip between the rollers, the grooves of one array intersect the grooves of the other, and the portions of the curved surfaces of the rollers between the grooves are in contact with each other, and the apparatus further comprises means for cutting portions from the dough lattice and means for frying the portions cut from the dough lattice.

When dough is supplied to the nip between the rollers at a suitable rate, and the rate of rotation of the rollers is suitably selected (which can readily be achieved in practice), then, upon rotation of the rollers, the grooves will be filled with the dough without undue compression of the dough producing ridges of dough, and apertures will be provided where the lands contact each other, so that a dough lattice emerges from the rollers.

In one arrangement of the apparatus, one of the rollers may have an array of longitudinally-extending grooves and the other roller may have an array of grooves extending circumferentially. Alternatively, one or both of the rollers may have one or more grooves extending helically around the roller, preferably, at an angle of 45° to the axis of the roller.

The apparatus of the invention may also incorporate any of the other features used for carrying out the process of the invention referred to above.

The invention also provides a fried food product having a lattice configuration produced by the process of the invention.

Two forms of a process for the production of fried food products in accordance with the invention, and a modification of those processes, will now be described, by way of example, with reference to the accompanying drawings, in which.

Figure 1:
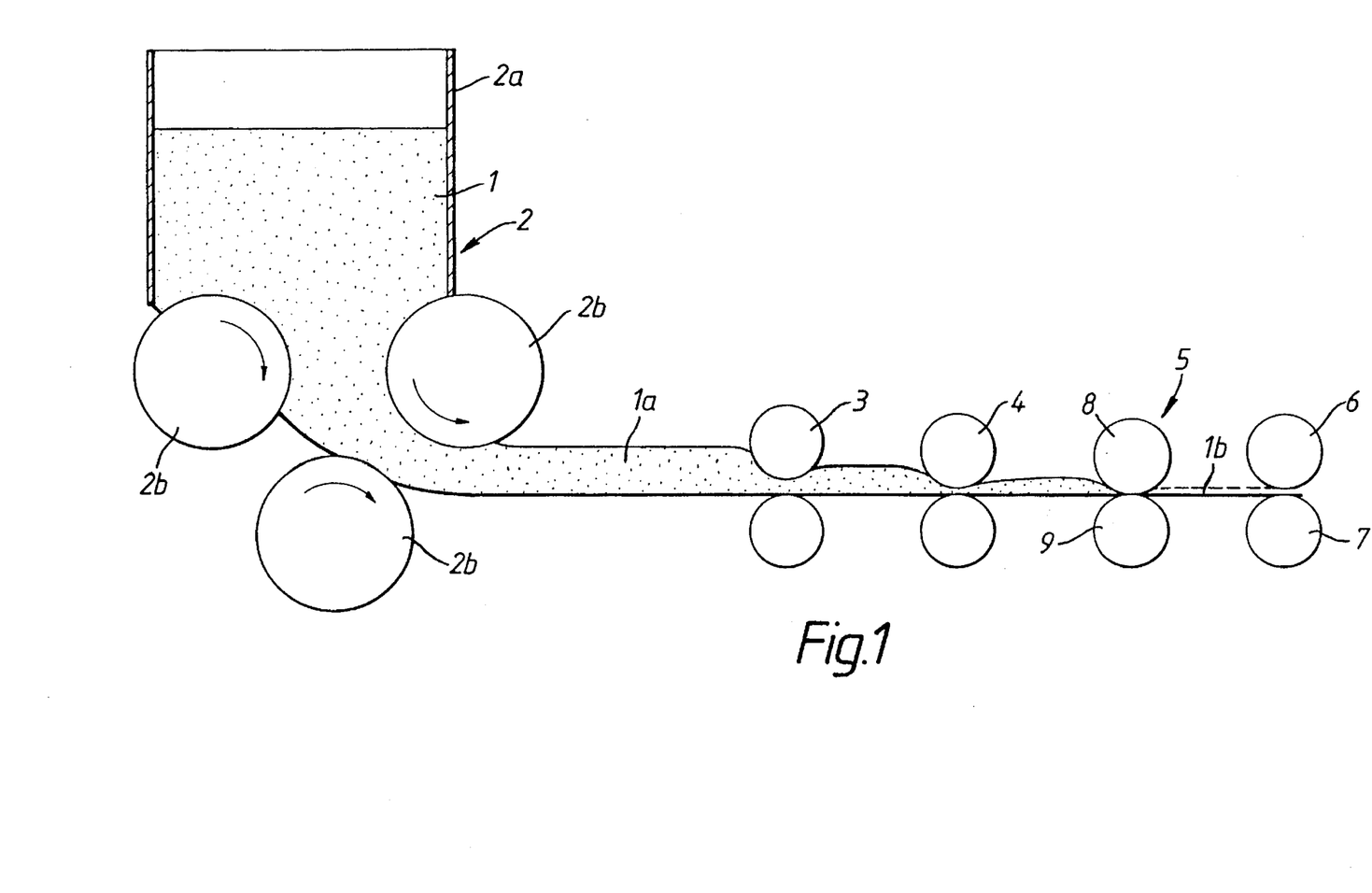
FIG. 1 is a diagrammatic side view of apparatus for forming a dough lattice and cutting out portions from the lattice in the first form of the process.

Referring to FIG. 1 of the accompanying drawings, in the first form of the process of the invention, dough 1 formed in a mixer (not shown) is fed into a hopper 2a of a three-roll sheeter, indicated generally by the reference numeral 2. The three-roll sheeter 2 comprises three rolls 2b arranged to form the dough 1 into a flat sheet 1a, which emerges from the sheeter 2, and is fed by a conveyor (not shown) to a nip between a first pair of gauge rollers 3 and then by means of a second conveyor (not shown) to a nip between a second pair of gauge rollers 4. Each pair of the gauge rollers 3 and 4, respectively, reduces the thickness of the sheet 1a.

From the second pair of gauge rollers 4, the flat sheet 1a of dough is fed by means of a third conveyor (not shown) to a nip between a pair of grooved rollers, indicated generally by the reference numeral 5, which are shown on a larger scale in, and described in more detail with reference to, FIGS. 3, 4 and 5. The grooved rollers 5 form the dough into a lattice 1b as described in more detail below. The dough lattice 1b emerging from the grooved rollers 5 is fed by means of a further conveyor between a cutter roller 6 and a support roller 7 where individual portions are cut from the lattice of the shape and size required for the food products. The individual portions are then transported to a fryer (not shown) where they are fried to form a snack food product.

Figure 3:
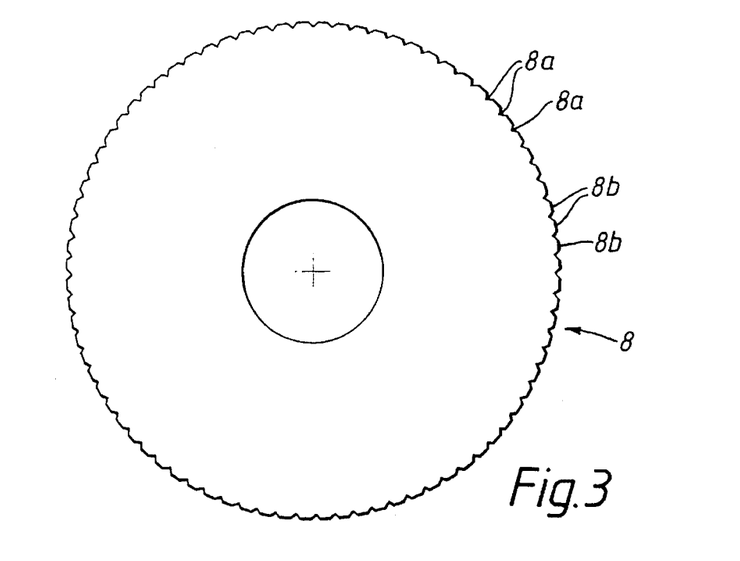
FIG. 3 is an end view, on a larger scale than FIG. 1 or FIG. 2, of one of a pair of grooved rollers that forms part of the apparatus shown in FIG. 1 or FIG. 2.
Figure 4:
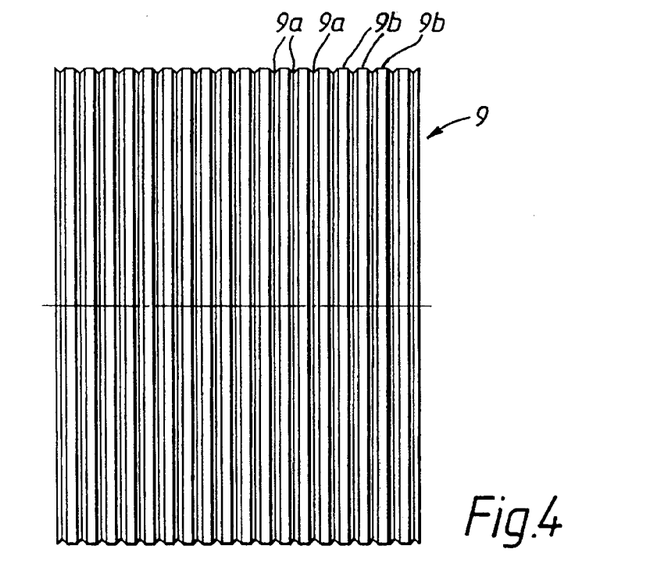
FIG. 4 is a side view, on the same scale as FIG. 3, of the other roller of the pair of grooved rollers shown in FIG. 1.
Figure 5:
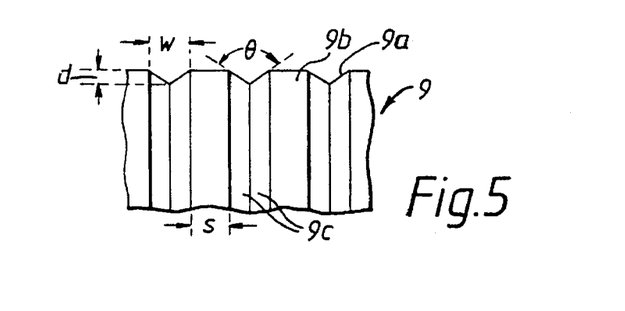
FIG. 5 is a side view, on a larger scale than FIG. 4, of a portion of the curved surface of the roller of FIG. 4.

The pair of grooved rollers 5 consist of an upper roller, indicated generally by the reference numeral 8 and shown in FIG. 3 and a lower roller, indicated generally by the reference numeral 9 and shown in FIG. 4. The rollers 8 and 9 are rotatably mounted about axes in the same vertical plane and are arranged with their curved surfaces in contact with each other. Drive means (not shown) are provided to enable the rollers to be driven in the opposite senses.

The upper roller 8 has longitudinally-extending grooves 8a indented in its curved surface. The portions of the curved surface or lands 8b between the grooves 8a are of uniform width along their length. The lower roller 9 has indented in its curved surface grooves 9a which extend circumferentially around the roller and has lands 9b of uniform width between the grooves. As can be seen in FIG. 5, each groove 9a has a pair of side walls 9c that are inclined towards each other and meet at the base of the groove at an angle θ, the line along the base of each groove being substantially straight. Each groove 9a is of a depth d and is of a width w at the curved surface of the roller. The lands 9b between the grooves 9a are each of a width s. The grooves 8a have the same values for θ, d and w as the grooves 9a, and the width of lands 8b between the grooves 8a is also the same as the width of the lands 9b.

As an example of suitable dimensions, the angle θ may be 110°, the depth d of each groove 8a and 9a may be 0.75 mm and the width w at the curved surface of the roller 2.14 mm. The width s of each land 8b and 9b may be 2.0 mm. The diameter of the rollers 8 and 9 may be 105 mm, and the length of each of the rollers 76.7 mm.

Referring to the operation of the grooved rollers 8 and 9, the sheet of dough 1a, which has been reduced in thickness by the two pairs of gauge roller 3 and 4, is fed to the grooved rollers, which initially may be out of contact with each other, but are rotating in opposite senses. When the sheet of dough 1a first enters the nip between the rollers 8 and 9, the rollers can be closed together bringing the lands 8b and 9b into contact with each other along the lengths of the rollers. Then, as the sheet 1a passes between the rollers 8 and 9, the dough enters the grooves 8a and 9a in the rollers and the part of the dough that contacts the lands 8b and 9b of the rollers is pushed into the grooves. With the rate of supply of the dough to the rollers 8 and 9 and the rate of rotation of the rollers suitably selected, the grooves 8a and 9a in the rollers are filled with dough without undue compression of the dough and without exerting undue force on the rollers which would cause the rollers to move out of contact with each other over any part of their length. Thus, all the dough is formed into ridges, the dough sheet 1a having imparted to its upper surface an array of ridges corresponding to the grooves 8a of the roller 8, the ridges extending in a direction transverse to the direction of travel of the dough through the rollers. The lower roller 9 imparts to the lower surface of the dough sheet 1a an array of ridges corresponding to the grooves 9a extending in a direction parallel to the direction of travel of the dough through the rollers. Thus, the ridges on the upper surface of the dough intersect the ridges on the lower surface at an angle of 90°. The lands 8b and 9b, where they contact each other, form apertures between the ridges and, as the lands are of equal width, the apertures formed in the dough sheet 1a are square. Accordingly, a lattice configuration is imparted to the dough, the lattice being formed only by the intersecting ridges. The bases of the ridges are connected to one another where they intersect.

Figure 6:
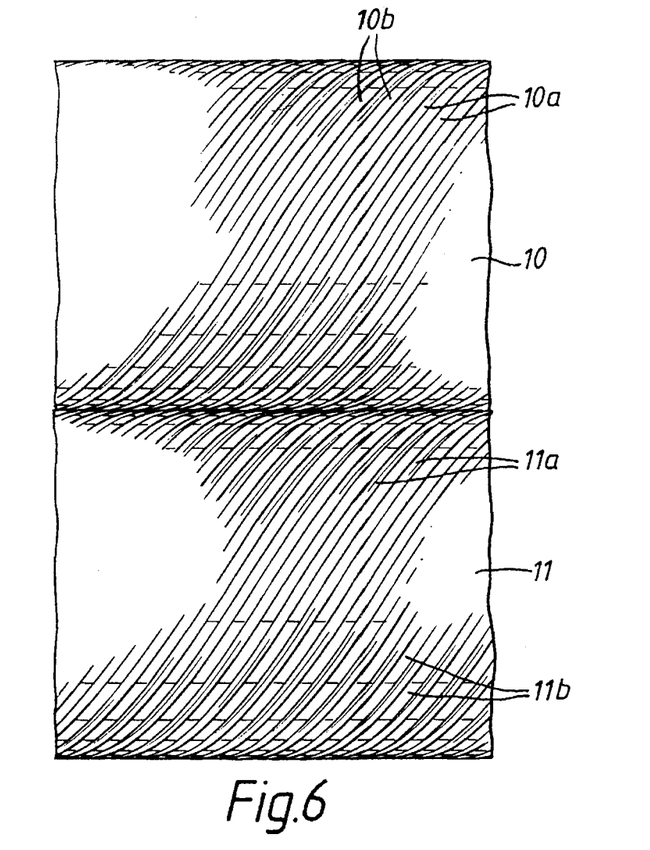
FIG. 6 is a view of an alternative pair of grooved rollers to that shown in FIGS. 3, 4 and 5 and suitable for use in the apparatus of FIGS. 1 or 2, the view being in the direction in which dough is fed to the rollers.
Figure 9:
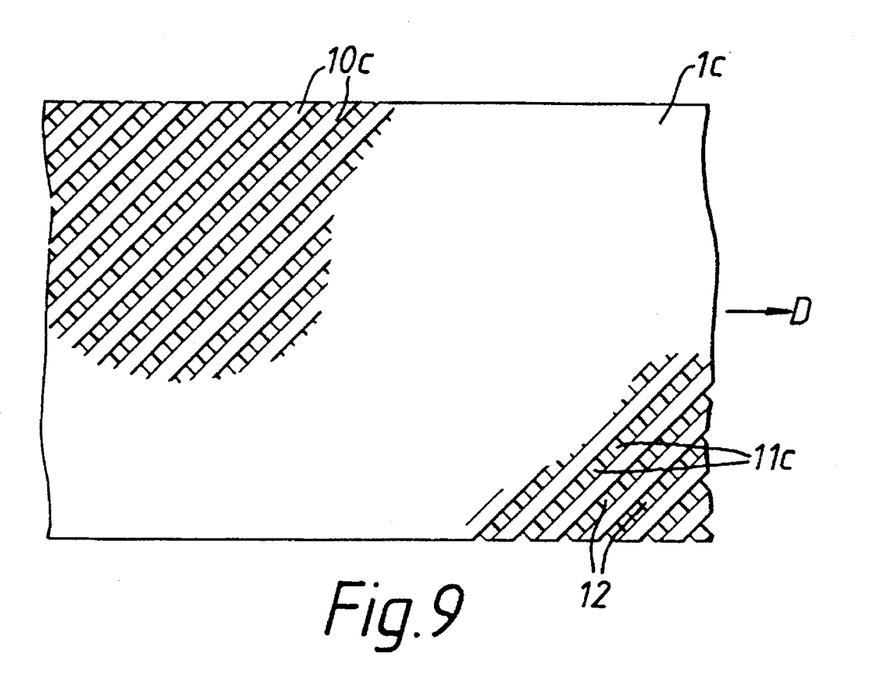
FIG. 9 is a plan view of a dough lattice emerging from the rollers of FIG. 6.

The grooved rollers 8 and 9 can be replaced by a pair of grooved rollers 10 and 11 each having a series of helically-extending grooves 10a and 11a, respectively, and lands 10b and 11b, respectively, between the grooves as shown in FIG. 6. Such rollers impart arrays of ridges 10c and 11c, respectively, to a sheet of dough 1c as can be seen in FIG. 9. The ridges 10c and 11c are imparted in a similar manner to the ridges imparted by the rollers 8 and 9, but in the case of the rollers 10 and 11, the helical arrangement of the grooves 10a and 11a rotating in opposite senses to each other mean that the ridges 10c and 11c are inclined at angles of 45° to the direction of travel D of the dough emerging from the nip of the rollers, the ridges 10c being inclined in the opposite sense to the ridges 11c. The ridges 10c and 11c define square apertures 12 between the ridges, the diagonals of the squares extending in the direction of travel of the dough sheet.

Figure 7:
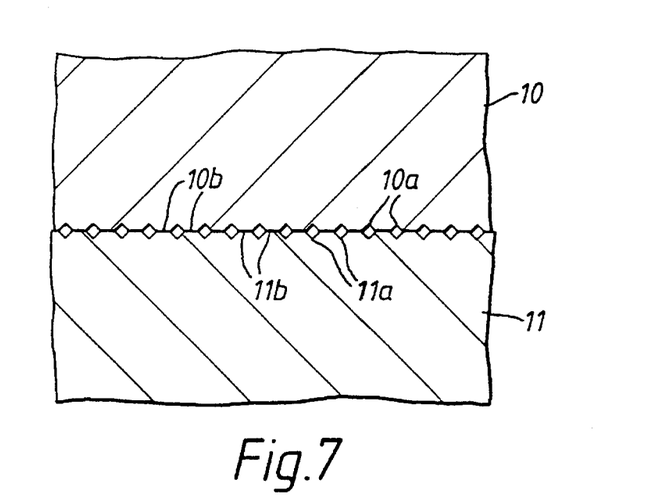
FIG. 7 shows a portion of a vertical cross-section through the rollers of FIG. 6 at one instant in the process.
Figure 8:
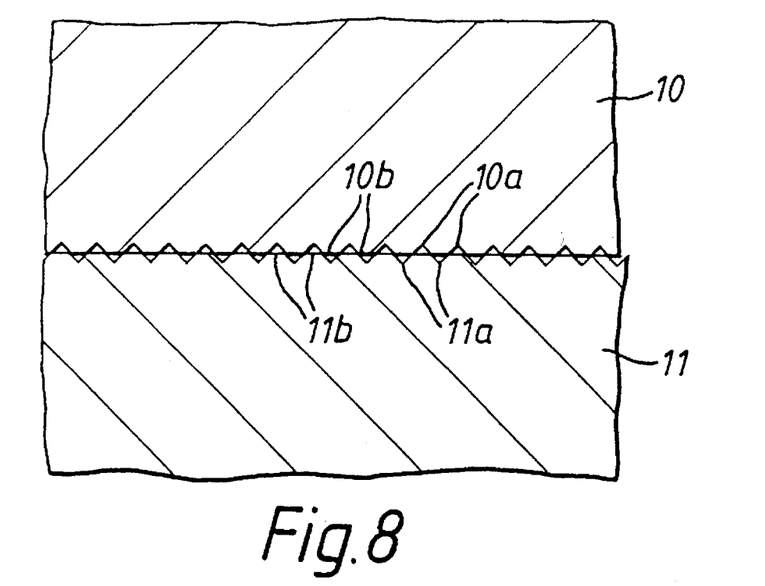
FIG. 8 shows a portion of a vertical cross-section through the rollers of FIG. 6 at another instant in the process.

FIG. 7 shows a cross-section through a portion of the contacting rollers 10 and 11 at the instant when the grooves 10a of the upper roller 10 are exactly aligned with the grooves 11a of the lower roller 11 in the centre of the nip. FIG. 8 shows the same view as FIG. 7 but at an instant later when the grooves 10a of the upper roller 10 are opposite the lands 11b of the roller 11 and the grooves 11b are opposite the lands 10b.

The shape of the apertures 12 can be altered from square to rhomboidal as the dough lattice 1c emerges from the rollers 10 and 11 by increasing the tension of the dough lattice 1c. That can be achieved by increasing the speed of the conveyor transporting the dough lattice to the cutter roller 6.

An example of suitable dimensions for the rollers 10 and 11 is as follows:

The rollers 10 and 11 may be of a diameter of 15 cm and a length of 30 cm. The side walls that define each of the grooves 10a and 11a may meet at the base of the groove at an angle of 92.5°. The width of each groove at the curved surface of the roller may be 2.87 mm and the depth of each groove may be 1.38 mm. The width of each of the lands between adjacent grooves may be 2.8 mm.

The grooved rollers 8, 9 and also the grooved rollers 10,11 may be made from acetal, or have an acetal coating. Alternatively, they may be made from metal.

Although each of the pairs of rollers 8, 9 and 10, 11 are formed with grooves of the same dimensions on each roller of the pair, the dimensions of the grooves may differ, one roller having, for example, shallower grooves than the other.

Figure 2:
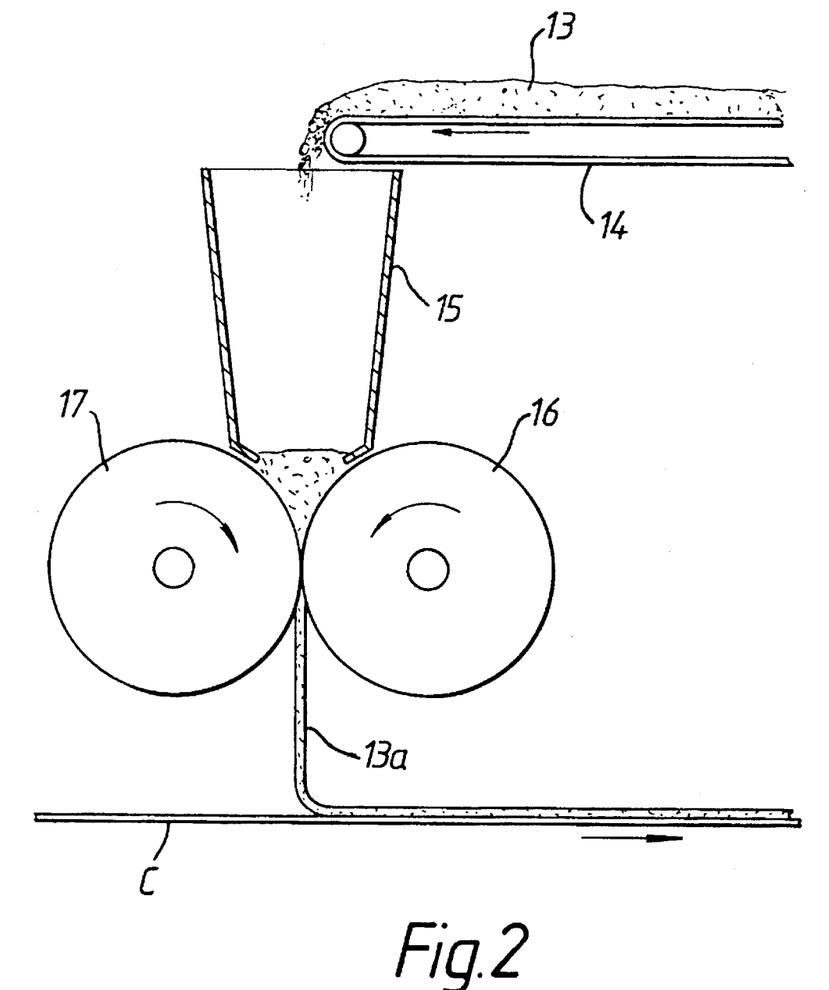
FIG. 2 is a diagrammatic side view of apparatus for forming a dough lattice in the second form of the process.

In the second form of the process of the invention shown in FIG. 2, a crumbly dough 13 is formed in a mixer (not shown) and is transported by a dough feed conveyor 14 to a position directly over a hopper 15. The hopper 15 is, in turn, positioned directly over a nip between a pair of grooved rollers, indicated generally by the reference numerals 16 and 17. The amount of dough 13 on the conveyor 14 and the speed of the conveyor are controlled to ensure that a head of dough is maintained in the nip, but that the height of the head does not exceed a certain value. The rollers 16 and 17 are positioned with their axes parallel to each other in the same horizontal plane for rotation in opposite senses, and have their curved surfaces in contact, in operation. The rollers 16 and 17 may either be similar to the pair of rollers 8 and 9 or to the pair of rollers 10 and 11. In either case, they form a dough lattice 13a which emerges from the nip and is transported away from the rollers 16 and 17 on a conveyor belt C to a cutter roller (not shown) and from there to a fryer (not shown).

Before the food product produced by either the apparatus of FIG. 1 or FIG. 2 is fried, it can be subjected to a preliminary drying step to decrease the moisture content to some extent before the frying step. Thus, for example, the portions of dough lattice may be placed in an oven at a temperature within the range of from 93° C. to 148° C. for a time of approximately 20 seconds before frying. The food product may then be fried for a time of between 20 and 30 secs. at a temperature of 182° C.

Figure 10:
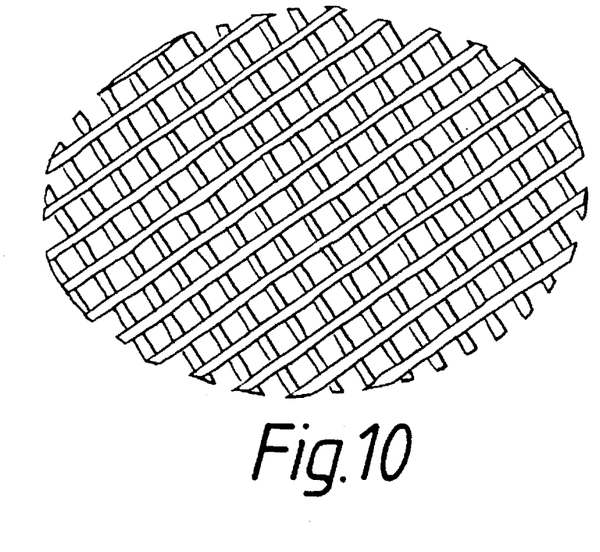
FIG. 10 is one form of a snack food product produced by the process of the invention.
Figure 11:
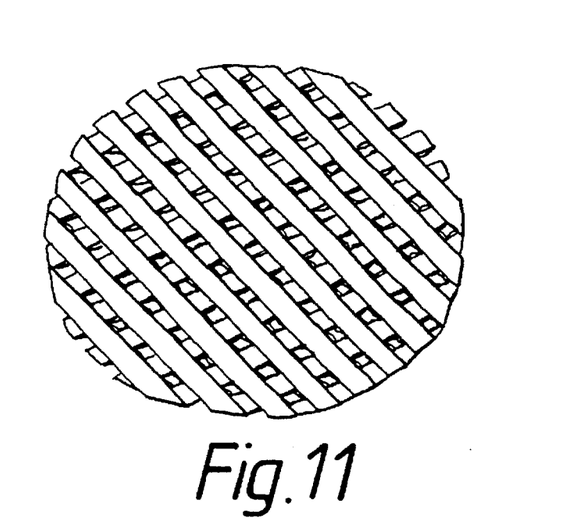
FIG. 11 is a second form of snack food product produced by the process of the invention.

Two examples of snack food products formed in accordance with the process of the invention are shown in FIGS. 10 and 11, the food product shown in FIG. 10 having relatively fine ridges, whereas the food product of FIG. 11 has thicker ridges and smaller apertures.

The following Examples illustrate the invention:

EXAMPLE 1

A dough was formed, the composition of which was as follows:

|  | Weight (grams) |
|---|---|
| Low leach potato flake | 1740.0 |
| Potato Starch | 93.0 |
| Salt | 9.3 |
| GMO/Oil | 27.6 |
| Water (at 20° C.) | 1110.0 |

(GMO/Oil is a glycerol mono-oleate and palm oleine blend and was used in the proportions of one part by weight of glycerol mono-oleate to three parts by weight of palm oleine.)

In a Stephan UM12F mixer using two sharp mixing blades rotating at a speed of 1500 rpm, the low leach potato flake, potato starch and salt were blended for 30 seconds. The GMO/Oil blend was added through a funnel at a constant rate while mixing continued for a further 15 seconds. After a further 15 seconds of mixing, the water was added at a constant rate through a funnel while mixing was continued, that step taking 60 seconds. Mixing was continued for a further 90 seconds so that the total mixing time was 210 seconds. The dough formed in that manner was crumbly and did not cohere.

The crumbly dough was fed vertically into the nip of a pair of acetal rollers positioned with their axes parallel to each other and in the same horizontal plane. One of the rollers was formed with longitudinally-extending grooves and the other roller was formed with circumferentially-extending grooves similar to the rollers shown in FIGS. 3 to 5, and having the following dimensions. The angle was 110°, the depth d of each groove 8a and 9a was 0.75 mm and the width w at the curved surface of the roller was 2.14 mm. The width s of each land 8b and 9b was 2.0 mm. The diameter of the rollers 8 and 9 was 105 mm, and the length of each of the rollers 76.7 mm. The cross-sectional area of each of the grooves was 0.80 mm².

The rollers were positioned relative to one another so that, with dough present to a height of 1.5 cm in the nip, the curved surfaces of the rollers (that is to say, the lands between the grooves) were just in contact with each other as the dough was passing between the rollers. The rollers were turned manually using a handle connected to one roller, the other being driven through a series of gears. A dough lattice having square apertures emerged from the bottom of the nip between the grooved rollers.

The dough lattice was cut into portions by hand using a 50 mm. diameter circular plastic cutter.

The 50 mm discs were fried in palm oleine (a fraction of palm oil) at 165° C. for 50 seconds in a batch or static Valentine fryer. The resulting savoury food products had a fine lattice appearance and were crisp, having a moisture content of less than 1.5% by weight based on the total weight of the food product.

EXAMPLE 2

A dough was formed from the following ingredients:

| | Weight (kgs.) |
|---|---|
| Low leach potato flake | 4.550 |
| Water (at 20° C.) | 3.750 |
| Degerminated White Cornflour | 1.200 |
| Modified Maize Starch | 0.150 |
| Potato Starch | 0.100 |
| Salt | 0.050 |
| Oil | 0.150 |
| Glycerol mono-oleate | 0.050 |

To form the dough, the low leach potato flake, degerminated white cornflour, modified maize starch and potato starch were added to a mixing bowl of a Stephan UMM/SK44E mixer, and were blended for 30 seconds using two sharp blades rotating at a speed of 850 rpm and a rotating mixing baffle. The pre-blended glycerol monoleate and oil were added through a funnel at a constant rate while mixing continued for a further 15 seconds. After a further 15 seconds of mixing, the water was added at a constant rate through a funnel while mixing was continued, that step taking 60 seconds. Mixing was continued for a further 60 seconds so that the total mixing time was 180 seconds. The dough formed in that manner was crumbly and did not cohere.

Sheeting was performed using a motor-driven pilot-scale sheeting line similar to that shown in FIG. 1 and consisting of a three-roll sheerer and two pairs of smooth reduction rolls. The crumbly dough was fed into the three-roll sheerer which had a fluted forcing roll and two smooth sheeting rolls. A dough sheet of a thickness of 4.5 mm was produced. The thickness of that sheet was then further reduced to 3 mm and then 2.9 mm by feeding the sheet horizontally through the two pairs of reduction rollers.

The dough sheet from the reduction rollers was then fed to a pair of grooved rollers similar to those described with reference to FIGS. 6 to 8, and arranged with their axes parallel to each other and in the same vertical plane. The grooved rollers were made from acetal and had a diameter of 15 cm and a length of 30 cm. The sheet of dough was fed into the nip of the grooved rollers at an angle of 5° to the horizontal. The grooves on each of the rollers extended helically in a direction inclined at 45° to the direction of travel of the dough through the rollers, the grooves of one of the rollers meeting the grooves of the other at an angle of 90° in the nip. Each groove was defined by a pair of side walls that met at the base of the groove at an angle of 92.5°. The width of each groove at the curved surface of the roller was 2.87 mm and the depth of each groove was 1.38 mm. The width of each of the lands between adjacent grooves was 2.8 mm. The cross-sectional area of each of the grooves was 1.98 mm².

Initially the grooved rollers were out of contact with each other. After the dough sheet had entered the nip between the rollers, the gap between the rollers was closed until the curved surfaces of the rollers were in contact with each other. It was found that, with a sheet of dough of 2.9 mm in thickness being fed into the nip and with the rollers rotating so that their surface speed was 2.4 m/min., the curved surfaces of the rollers maintained contact with one another along their length and a well-defined dough lattice emerged from the other side of the nip. The dough lattice had square apertures and was readily released by the rollers. The shape of the apertures was adjusted by altering the tension of the dough lattice as it left the nip of the grooved rollers.

The dough lattice was cut by hand using a 50 mm diameter circular plastic cutter.

The 50 mm discs were fried in palm oleine (a fraction of palm oil) at 165° C. for 100 seconds in a static Valentine fryer. The resulting savoury food products had a well-defined coarse lattice structure. The food product was harder than that produced in Example 1.

What we claim is:

1. A process for producing fried food products, which comprising the steps of:

feeding a dough to a nip between a pair of contrarotating rollers arranged with their curved surfaces in contact with each other, each of the rollers having grooves indented in its curved surface, and wherein the rollers push the dough into the grooves and form the dough into a lattice comprising an array of ridges imparted to the dough by one of the rollers, which ridges are spaced apart from each other and substantially all of which extend in substantially the same direction as each other, and an array of ridges imparted to the dough by the other roller, which ridges are spaced apart from each other and substantially all of which extend in substantially the same direction as each other, the direction in which the ridges of one array extend being at an angle to that of the other array so that the ridges of one array intersect the ridges of the other, and the contacting portions of the curved surfaces of the rollers providing apertures in the dough between the intersecting ridges;

cutting portions from the dough lattice; and frying the portions to provide food products having a lattice configuration.

2. The process of claim 1, wherein the dough is made from an ingredient selected from the group consisting of wheat, maize, potato, rice and mixtures thereof.

3. The process of claim 1, including mixing the dough, and feeding the mixed dough directly to the nip between the grooved rollers.

4. The process of claim 1, including forming the dough into a flat sheet, and then feeding the dough sheet to the grooved rollers.

5. The process of claim 4, wherein the dough is formed into a flat sheet by passing the dough between one or more pairs of smooth rollers.

6. The process of claim 1, wherein the ridges imparted to the dough by one of the rollers intersect the ridges imparted to the dough by the other roller at an angle of about 90°.

7. The process of claim 1, wherein the apertures between the ridges of the dough at least immediately before it leaves the grooved rollers are substantially square.

8. The process of claim 1, wherein one of the rollers is formed with an array of longitudinally extending grooves, and the other roller is formed with an array of grooves extending circumferentially of the other roller.

9. The process of claim 1, wherein one or each of the rollers is formed with one or more grooves extending helically around the roller.

10. The process of claim 9, wherein the ridges of both of the arrays imparted to the dough extend in directions which are inclined at angles of about 45° to the direction of travel of the dough through the rollers, and the ridges of one array are inclined in the opposite sense to the ridges of the other array.

11. The process of claim 1, wherein each groove has a pair of side walls that meet at the base of the groove at an angle within the range of from about 60° to 120°.

12. The process of claim 11, wherein each groove has a pair of side walls that meet at the base of the groove at an angle within the range of from about 90° to 110°.

13. The process of claim 1, wherein the depth of each groove is within the range of from about 0.50 to 1.50 mm.

14. The process of claim 13, wherein the depth of each groove is within the range of from about 0.75 to 1.38 mm.

15. The process of claim 1, wherein the width of each groove at the curved surface of the roller is within the range of from about 1.73 to 5.20 mm.

16. The process of claim 15, wherein the width of each groove at the curved surface of the roller is within the range of from about 2.14 to 2.87 mm.

17. The process of claim 1, wherein the grooves are separated by lands, and the width of each land between adjacent grooves is within the range of from about 1.00 to 5.50 mm.

18. The process of claim 17, wherein the width of each land between adjacent grooves is within the range of from about 1.40 to 2.80 mm.

19. The process of claim 11, wherein the cross-sectional area of each groove is within the range of from about 0.43 to 3.90 mm$^2$.

20. The process of claim 19, wherein the cross-sectional area of each groove is within the range of from about 0.80 to 1.98 mm$^2$.

21. The process of claim 1, wherein the grooves impart ridges to the dough which extend along substantially straight lines.

22. The process of claim 1, wherein the ridges extend along wavy lines.

23. The process of claim 1, wherein the grooves are separated by lands, and adjacent lands are of uniform width so that the ridges of each array imparted to the dough are uniformly spaced from each other.

24. The process of claim 1, wherein after the portions have been cut from the dough lattice they are subjected to a preliminary drying step before being fried.

25. The process of claim 1, wherein said contra-rotating rollers are arranged with their axes parallel to each other.

26. A fried food product having a lattice configuration and produced by a process as claimed in claim 1.

* * * * *

UNITED STATES PATENT AND TRADEMARK OFFICE
CERTIFICATE OF CORRECTION

PATENT NO.  : 5,576,041
DATED       : November 19, 1996
INVENTOR(S) : Andrew E.C. Clow and Brian D. Hill It is certified that error appears in the above-indentified patent and that said Letters Patent is hereby corrected as shown below:

Col. 5, line 59, after "FIG. 4" delete the period "." and insert a semi-colon --;--;

Signed and Sealed this

Ninth Day of December, 1997

BRUCE LEHMAN

*Attest:*

*Attesting Officer*         *Commissioner of Patents and Trademarks*